Jan. 25, 1927.

W. L. HINGER

WINCH

Filed Feb. 9. 1925

INVENTOR
WILLIAM L. HINGER.
BY
Richey, Hough & Watts
ATTORNEY

Jan. 25, 1927.

W. L. HINGER 1,615,543

WINCH

Filed Feb. 9. 1925

INVENTOR
WILLIAM L. HINGER.
BY
Richey Slough & Watts
ATTORNEY

Patented Jan. 25, 1927.

1,615,543

UNITED STATES PATENT OFFICE.

WILLIAM L. HINGER, OF CLEVELAND, OHIO, ASSIGNOR TO THE WHITE COMPANY, OF CLEVELAND, OHIO, A CORPORATION OF OHIO.

WINCH.

Application filed February 9, 1925. Serial No. 7,799.

My invention is an improvement in winches and more particularly of the type adapted to be attached to a motor truck or like vehicle having a source of power for operating the winch.

In order to more efficiently perform some of the duties imposed today on this type of winch, it has been found necessary to increase the speed with a consequent increase in demand on the bearings which were usually plain cylindrical bushings or bearings and ball thrust bearings. The results were that these bearings were unsuited for the service and quickly wore out, the bushings flaked off, and the balls were crushed or cut the wear plates necessitating frequent repair and often wrecking the entire winch. I have also found that winches of this type could be operated in only one direction since the thrust bearings were adapted to take up only the thrust in a single direction. If, by chance, the direction of the thrust were reversed, the winch would jam and become useless. In this type of winch I have found that the bearings heated up with high loads and speeds and expanded against the shaft which resulted in a tendency to seize the shaft, slowing up the steel worm and cutting into the bronze worm gear.

An important object of my invention, therefore, is the provision of a winch which may be operated at a relatively high speed without danger of injuring the bearings of the worm drive mechanism.

Another important object is to overcome all the disadvantages above noted and to provide a winch which will be adapted to present-day demands.

Another object of my invention is the provision of a winch which may be reversed in operation and of means for absorbing the reversed thrust created by such reversal of the winch.

Another object of my invention is the provision of a winch which can be easily disassembled.

A further object of my invention is the provision of means for adjusting the driving worm with respect to the driven worm gear.

A further important object of my invention is to provide a winch of the above character in which the bearings supporting the driving shaft are removable and interchangeable.

Another object of my invention is to provide a winch which is strong and durable, yet simple of construction and inexpensive to manufacture.

Other objects and advantages of my invention will become apparent from the following specification.

In the accompanying drawings illustrating embodiments of my invention—

Figure 1:
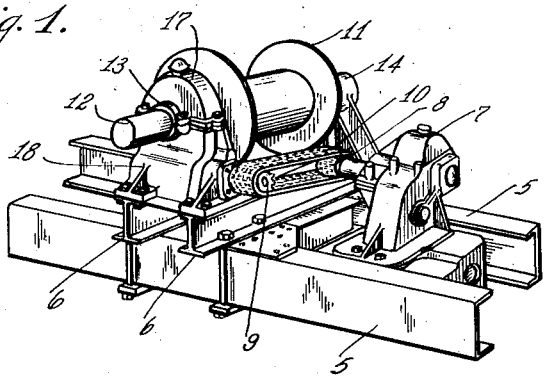
Fig. 1 is a perspective view of the winch secured to the chassis of a truck or other vehicle having a source of power.

In the drawings, the chassis of a motor vehicle is shown at 5, Fig. 1, and carries two I-beams 6 which are mounted transversely of the chassis and which support the winch assembly. A power take-off is provided at 7 which is connected to the driven shaft of the engine on the vehicle and its speed may be controlled by a system of transmission gearing within control of the operator. A sprocket 8 is carried by the take-off device and is connected to sprocket 9 on the winch by means of a driving chain 10.

Figure 3:
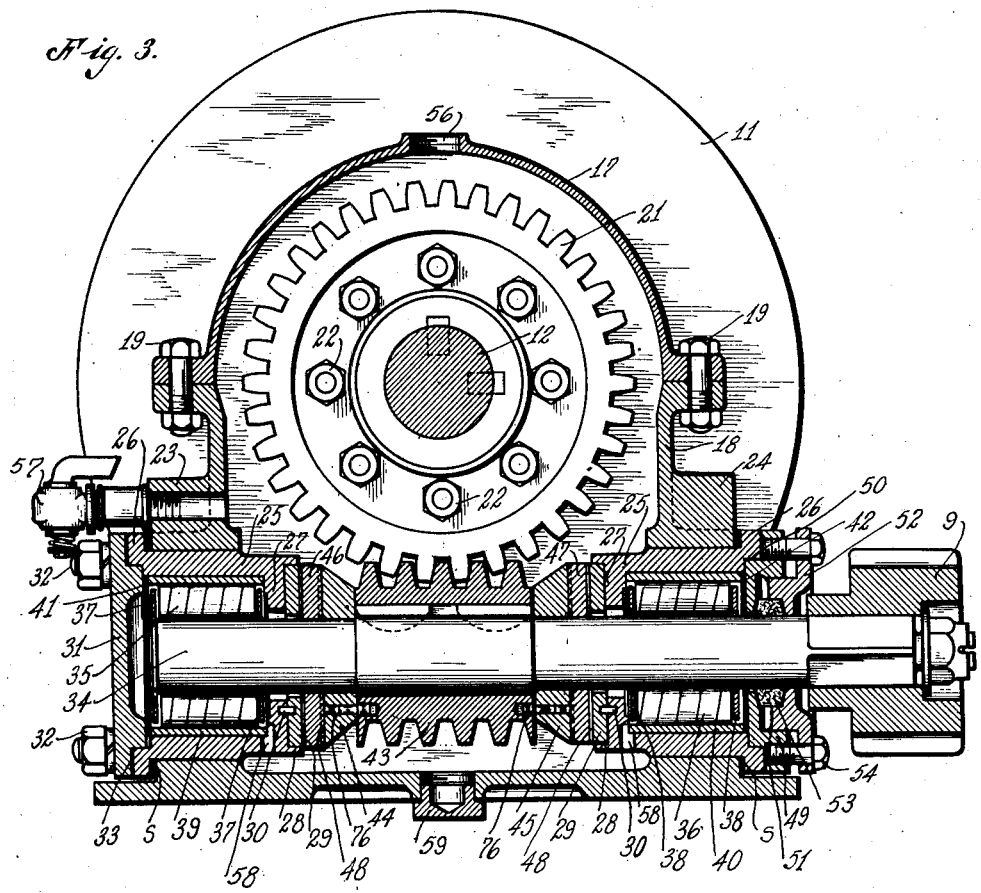
Fig. 3 is a central transverse section through the worm unit of the winch.
Figure 4:
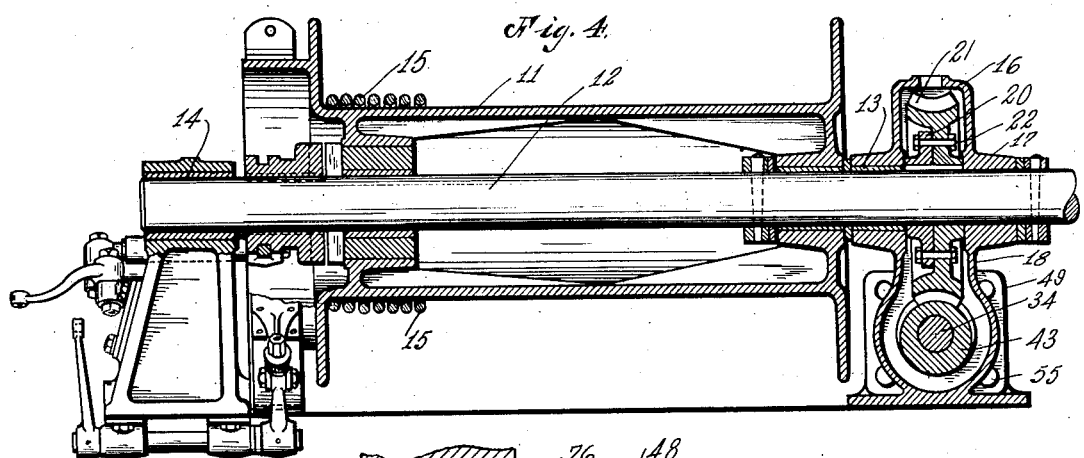
Fig. 4 is a longitudinal section of the worm unit and entire winch construction.

In Figs. 1 and 3 I have shown the winch and worm unit mounted on the I-beams transversely of the chassis. A winding drum 11, keyed to a shaft 12, which is supported by suitable bearings 13 and 14 near its ends, is adapted to carry a cable 15 and rotates with the shaft on the bearings 13 and 14.

Adjacent one end of the drum 11, I have provided a housing 16 formed of upper and lower sections 17 and 18, respectively, which are secured together by bolts 19. The shaft 12 passes through the housing as shown and carries a hub 20 which is keyed thereto within the housing. A worm gear 21 is also keyed to shaft 12 and secured to the hub by a series of bolts 22.

The lower section 18 of the housing is provided with aligned horizontal openings at each side of the base thereof which communicate with the interior of the base. I prefer that these openings be reinforced annularly as shown at 23 and 24 and that their inner walls be of relatively much greater width than the thickness of the walls of the housing. This arrangement not only strengthens the housing, but also provides a more sturdy construction for the bearing and shaft assembly.

In each of the openings I provide a bearing retaining shell 25 having a radially projecting annular flange 26 abutting the outer walls of the housing to limit the inward movement of the shell and a second radially projecting annular flange 27 extending inwardly toward the horizontal axis of the shell. This flange 27 is provided with an annular recess 28 for seating a wear plate 29. A shouldered pin 30 extends into the wear plate and the flange 27 to hold the plate against rotative movement.

One of the retaining shells 25 is provided with an end cap 31. Bolts 32 pass through the end cap and the wall of the retaining shell and into the housing. Lock nuts and washers are screwed down on the bolts to hold the cap in place. Suitable packing 33 may be employed between the end cap and the shell to prevent leakage of the lubricant carried within the housing.

A shaft 34 passes axially through the shells 25 and is rotatably supported therein by spring rollers bearings 35 and 36. It will be noted that I have eliminated the usual inner races for the rollers which are formed in bearings of this nature, and have provided in their stead for direct contact between the rollers and the shaft 34. The shaft, therefore, is hardened to form a hard wearing surface for the rollers. As is usual, the rollers are rotatably mounted in rings 37 and 38 surrounding shaft 34. The outer races of bearings 35 and 36 are shown at 39 and 40 and are seated snugly within the shells 25, the inner edge of each race abutting the inner walls of each of flanges 27 to limit longitudinal movement in one direction, while annular spring washers 41 and 42 are mounted between the corresponding outer races and the end caps, and exert a tension against the races tending to maintain them in the innermost portion of shells 25 when the end caps are in position.

In this connection, it will be well to note that I have provided for adjusting the longitudinal position of shaft 34 by means of shims S. These shims may be of different thicknesses and are inserted between the housing and the annular flanges 26 of the shells 25. In this manner I not only provide adjustment for the shaft 34, but I also provide means for compensating for any wear on the contacting surfaces of plates 29, 44, 45, 46 and 47.

Figure 5:
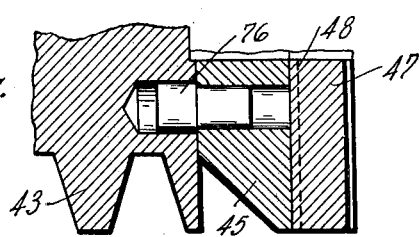
Fig. 5 is a detail of the shouldered pin construction used in securing the wear plates to their supports.

A worm 43 is keyed to the shaft 34 at a point about midway of the ends of the shaft and when in position, meshes with the worm gear 21. At each side of the worm I have provided wearing plates 44 and 45. These plates are secured to the worm in any convenient manner to rotate therewith. My preferred mode of securing the plates to the worm is shown in detail in Fig. 5 and consists of a pin 76 shouldered at one end and inserted within the worm body and the plates, the shouldered end abutting the inner sides of the plates and preventing the pin from extending beyond the outer surface of said plates.

It should be noted that I provide wearing plates of a relatively larger flat wearing surface. This is important since the thrust created by the meshing of gear 21 and worm 43 under power is more evenly distributed throughout the plates where there is a larger contacting surface. The use of ball bearings is unsuitable for this purpose as the thrust exerted on shaft 34 will only be taken up at the point of contact of the balls with the moving worm and the stationary race. When the balls are subjected to an enormous thrust or the device is operated at a relatively high speed they will be crushed. In my device I have provided greater contacting surface for taking up the thrust which insures a long life for the bearings and consequently the entire apparatus, and also makes it possible to operate the device under great loads, and at higher speeds than the ordinary winches now in use.

Intermediate each of the fixed plates 29 and the movable plates 44 and 45, respectively, I have provided grooved wearing plates 46 and 47, respectively, which are free to rotate in either direction about the shaft 34, and when the winch is in operation these free plates will creep along with the movable plates at about one-half the speed of the moving plate. This creeping action tends to reduce friction between the plates and consequently reduces the heat generated thereby. The grooves 48 are for the purpose of supplying lubricant from the housing to the wearing surfaces between the plates. The lubricant, therefore, not only acts as a friction reducer but also serves to cool the plates during rotation.

End cap 49, which is seated within a recess 50 in one of the shells 25 is of slightly different construction than the cap 31 in that it is provided with a recess 51 for the purpose of seating a packing cover 52. A packing 53 preferably metallic is held in place about shaft 34 within recess 51 by the cover 52.

Figure 2:
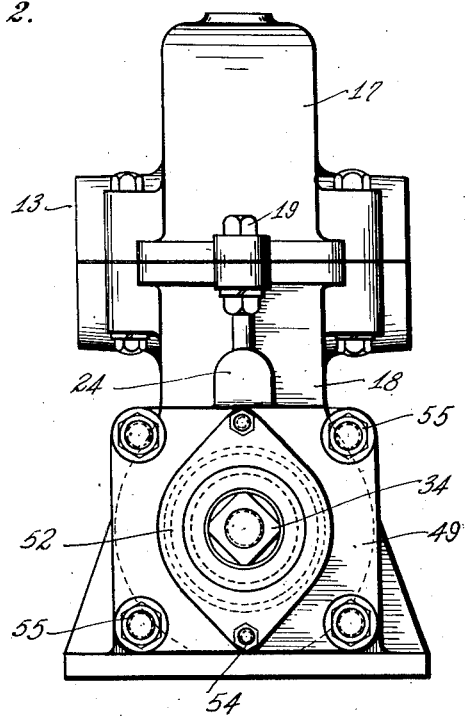
Fig. 2 is an end elevation of the winch unit.

Adjustment of the packing may be made from time to time by tightening the bolts 54 which secure cover 52 and cap 49 in adjustable relation. A second series of bolts 55 are provided as in Fig. 2 for securing cap 49 to shell 25 and the housing section 18.

It will be noted that even though I have slightly modified the structure of the end caps 31 and 49, they are interchangeable and the shaft 34 may be reversed with the sprocket 9 on the opposite side of it if so desired.

It will also be observed that I have provided the openings in the housing of such a diameter that the entire worm and shaft assembly may be removed therethrough.

I have provided an opening 56 in the top of the housing for the admission of a lubricant, preferably a liquid lubricant. A cock 57 is carried by the housing at a point where the desired level of lubricant can be maintained. I have found that the apparatus is more efficient where the lubricant is allowed to remain at a level just above the point where the worm and worm gear mesh. This prevents a tendency of the moving parts to churn the lubricant in the housing and forming a substance which would defeat the purpose of the lubricant. From the housing the lubricant has free access to the worm and worm gear teeth as well as to the wear plate surfaces through grooves 48, and thence to the spring roller bearings.

I have provided drain openings 58 in the bearing retaining shells 25 which communicate with the spaces within the shells containing the bearings and with the bottom of the housing. A drain 59 is provided in the base of the housing to discharge the oil and dirt. In operation, power is applied through a suitable transmission from the engine of the vehicle to the sprocket 9 and shaft 34 of the winch driving mechanism. Rotation of the shaft will impart motion through the worm 43 and worm gear 21 and thence to the winding drum 11. As the speed of rotation of shaft 43 is increased or as the load on the drum is increased, or both, a thrust is exerted in one direction approximately parallel with shaft 34. If the direction of rotation of shaft 34 is reversed the thrust will be applied in the opposite direction. Therefore, thrust in either direction may be taken up without adjustment of the apparatus in any respect. Adjustment of the thrust bearings to compensate for wear may be made by taking out shims of the proper size between the shell flanges and the housing, and the entire worm shaft and bearing may be disassembled from the housing by removing the end caps and one of the shells after which the rest of the assembly is passed out of the opening in the opposite side of the housing.

Various changes may be made in the construction described without departing from the spirit of my invention or the scope of the appended claims.

I claim:—

1. In a winch driving mechanism the combination of, a housing, a worm gear mounted to rotate therein, bearing retaining shells carried by said housing, said shells being in alignment, roller bearings carried within said shells, a shaft supported by said bearings, a worm keyed to said shaft, and thrust bearings comprising a plurality of wear plates disposed between the worm and each of said roller bearings, certain of said wear plates being carried by said retaining shells.

2. In a winch driving mechanism the combination of, a housing, a worm gear mounted to rotate therein, bearing retaining shells carried by said housing, said shells being in alignment, roller bearings carried within said shells, a shaft supported by said bearings, a worm keyed to said shaft, and thrust bearings comprising a plurality of wear plates disposed between the worm and each of said roller bearings, certain of said wear plates being carried by said shaft to rotate therewith, plates carried by said retaining shells, and plates intermediate said first and second named plates freely rotatable about said shaft and adapted to be engaged on the faces thereof by said first and second named plates.

3. In a winch driving mechanism, the combination of a housing, a worm gear mounted to rotate therein, bearing retaining shells carried by the housing, the shells being in alignment, roller bearings carried within the shells, a shaft supported by said bearings, a worm geared to said shaft, and thrust bearings comprising a plurality of wear plates disposed between the worm and each of said roller bearings, certain of said wear plates being carried by said retaining shells, and means for shifting said shaft and worm assembly axially within the housing.

4. In a winch driving mechanism, the combination of a housing, a worm gear mounted to rotate therein, bearing retaining shells carried by said housing, said shells being in alignment, roller bearings carried within said shells, a shaft supported by said bearings, a pinion on one end of said shaft a worm keyed to said shaft and thrust bearings disposed between the worm and each of said roller bearings, said shaft, shells, and bearing assembly being capable of being reversed within the housing whereby a driving connection to said shaft through said pinion may be had from the reversed side of said housing.

In testimony whereof I hereunto affix my signature this 4th day of February, 1924.

WILLIAM L. HINGER.